United States Patent
Soetemans

(10) Patent No.: US 7,293,076 B2
(45) Date of Patent: Nov. 6, 2007

(54) METHOD AND SYSTEM FOR AUTOMATICALLY NUMBERING SHELVES IN A MULTI-SHELF NETWORK ELEMENT

(75) Inventor: Joseph Soetemans, Nepean (CA)

(73) Assignee: Alcatel Canada Inc., Kanata, Ontario (CA)

( * ) Notice: Subject to any disclaimer, the term of this patent is extended or adjusted under 35 U.S.C. 154(b) by 565 days.

(21) Appl. No.: 10/012,433

(22) Filed: Dec. 12, 2001

(65) Prior Publication Data
US 2003/0061313 A1    Mar. 27, 2003

(30) Foreign Application Priority Data
Sep. 27, 2001    (CA)  .................................... 2358027

(51) Int. Cl.
*G06F 13/00*    (2006.01)
(52) U.S. Cl. .................................................... 709/220
(58) Field of Classification Search ................ 370/248, 370/401; 709/223–226, 220–222, 227–229; 715/735; 379/325
See application file for complete search history.

(56) References Cited

U.S. PATENT DOCUMENTS

| | | | |
|---|---|---|---|
| 5,374,280 A | 12/1994 | Den Dulk | |
| 5,465,330 A | 11/1995 | Kanda et al. | |
| 5,796,736 A | 8/1998 | Suzuki et al. | |
| 6,229,540 B1 * | 5/2001 | Tonelli et al. | 715/735 |
| 6,289,043 B1 | 9/2001 | Kumata | |
| 6,333,981 B1 * | 12/2001 | Weir et al. | 379/325 |
| 6,408,210 B1 | 6/2002 | Bornzin et al. | |
| 6,421,322 B1 * | 7/2002 | Koziy et al. | 370/248 |
| 6,498,949 B2 | 12/2002 | Levine et al. | |
| 6,738,818 B1 * | 5/2004 | Shah | 709/228 |
| 6,760,339 B1 * | 7/2004 | Noel et al. | 370/401 |
| 2002/0165961 A1 * | 11/2002 | Everdell et al. | 709/225 |

FOREIGN PATENT DOCUMENTS

EP    0 918 411    5/1999

OTHER PUBLICATIONS

Mikazuki et al., High-speed data transmission in a rack system with coaxial board connectors, IEEE Transaction on vol. 17, issue: 2, Jun. 1994, pp. 282-285.*
Abstract for JP 63 199555 to Chikao, Aug. 18, 1988, Patent Abstracts of Japan, vol. 012, No. 481 (E-694), Dec. 15, 1988.

* cited by examiner

*Primary Examiner*—Robert B Harrell
(74) *Attorney, Agent, or Firm*—Marks & Clerk; Richard J. Mitchell

(57) ABSTRACT

The present invention provides a system and method of evaluating a shelf connected to a port of a control complex in a network element via a communications link, the shelf having shelf configuration information, and the port having a port identifier. In an embodiment, the method comprises the steps of: a) establishing communications between the shelf and the control complex; b) providing the shelf configuration information and the port identifier to the control complex; and c) utilizing the shelf configuration information and the port identifier, together with predetermined system configuration rules, to evaluate the suitability of the shelf being connected to said port. In another embodiment, the method further includes the step of assigning a shelf identifier to the shelf in response to the shelf being connected in accordance with the predetermined system configuration rules.

12 Claims, 6 Drawing Sheets

METHOD AND SYSTEM FOR AUTOMATICALLY NUMBERING SHELVES IN A MULTI-SHELF NETWORK ELEMENT

FIELD OF THE INVENTION

The invention relates to a method and system for automatically numbering shelves in a multi-shelf network element.

BACKGROUND OF INVENTION

Many routing switch platform architectures allow modules to be installed and replaced in a modular fashion. Typically, the modules are connected manually and configured by a combination of software and/or hardware (jumpers, dip switches, etc.) for system operation. During initial installation, or during a subsequent maintenance procedure, cables may be connected or reconnected incorrectly. Using prior art methods and systems to correct such cabling errors tend to be cumbersome and, in some cases, the errors may not be detected until an attempt is made to bring an incorrectly cabled shelf into service and other in-service shelves are adversely affected.

Accordingly, there is a need for an improved method and system for correcting cabling errors and for automatically numbering shelves which overcomes the limitations in the prior art.

SUMMARY OF INVENTION

In accordance with an embodiment of the invention, there is provided a method of evaluating a shelf connected to a port of a control complex in a network element via a communications link, said shelf having shelf configuration information, and said port having a port identifier, said method comprising:
a) establishing communications between said shelf and said control complex;
b) providing said shelf configuration information and said port identifier to said control complex; and
c) utilizing said shelf configuration information, said port identifier, and a set of predetermined system configuration rules, to evaluate the correctness of said shelf being connected to said port.

In another embodiment, the method further includes the step of assigning a shelf identifier to said shelf in response to said shelf being correctly connected in accordance with said set of predetermined system configuration rules.

In yet another embodiment, said shelf configuration information includes a unique serial number.

In still another embodiment, said assigned shelf identifier is associated with said port identifier.

In another embodiment, said step of establishing communications comprises establishing a point-to-point channel between said shelf and said control complex.

In yet another embodiment, the method further includes the step of storing said shelf configuration information, and corresponding port identifier in a configuration database.

In another aspect, the present invention provides a method of re-evaluating a shelf previously connected to a port of a control complex in a network element via a communications link, said shelf having shelf configuration information, and said port having a port identifier, said method comprising:
a) establishing communications between said shelf and said control complex;
b) providing said shelf configuration information and said port identifier to said control complex;
c) retrieving, from a configuration database, previously stored configuration information for said shelf and a corresponding port identifier; and
d) utilizing said shelf configuration information, said port identifier, said previously stored configuration information for said shelf and said corresponding port identifier, and a set of predetermined system configuration rules, to evaluate the correctness of said shelf being reconnected to said port.

In another embodiment, the method further includes the step of reassigning a previously assigned shelf identifier to said shelf in response to said shelf being reconnected in accordance with said predetermined system configuration rules.

In yet another aspect, the present invention provides a system for evaluating a shelf connected to a port of a control complex in a network element, said shelf having shelf configuration information and said port having a port identifier, the system comprising:
i) a control management point (CMP) on said control complex;
ii) a shelf management point (SMP) on said shelf; and
iii) a connector for connecting each said shelf to said control complex via said port so as to provide said shelf configuration information and said port identifier to said CMP; wherein, in operation, said CMP is adapted to use said shelf configuration information and said port identifier, and a set of predetermined system configuration rules, to determine whether said SMP is correctly connected to said port.

In another embodiment, in response to an SMP being correctly connected to said port, said CMP is adapted to assign a shelf identifier to said SMP.

In yet another embodiment, said connector includes a point-to-point channel.

In still another embodiment, said shelf configuration information is provided by said SMP to said CMP through said point-to-point channel.

In another embodiment, the system further comprises a configuration database for storing said shelf configuration information and a corresponding port identifier for said SMP, said shelf configuration information and corresponding port identifier being retrievable by said CMP for subsequent re-evaluation of a previously identified shelf in accordance with said predetermined system configuration rules.

In yet another embodiment, the system includes a pair of SMPs that are connected by a mate link for exchanging information between said pair of SMPs, and said pair of SMPs is recognized as an active/inactive pair by said CMP, whereby, said CMP applies predetermined system configuration rules for an active/inactive pair of SMPs.

In yet another aspect, the present invention provides a method of automatically assigning a shelf identifier to a shelf in a network element having a plurality of shelves, the method comprising the steps of:
a) connecting a cable adapted to carry a point-to-point channel and a shared communications channel from a controller shelf to the shelf of the network element;
b) assigning, by the controller shelf over the point-to-point channel, a cable identifier to the cable, the cable identifier corresponding to an identifier of the port to which the cable is connected;
c) determining by the shelf, a communications address in dependence upon the cable identifier;

d) requesting, by the controller shelf via the shared communications channel and using the communications address, information about the shelf;
e) determining, by the controller shelf using requested information received from the shelf, whether the shelf is connected to the controller shelf in accordance with predetermined system configuration rules; and
f) assigning, by the controller shelf, the shelf identifier to the shelf response to the shelf being connected in accordance with the system configuration rules.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
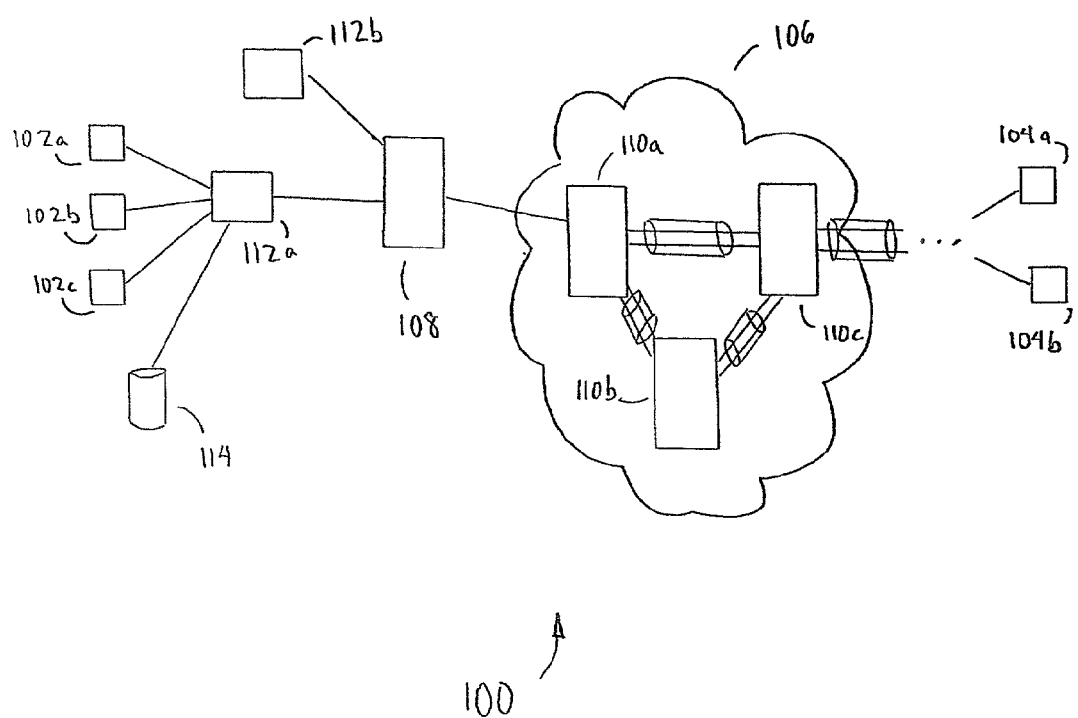
FIG. 1 is a block diagram of a communication network, utilizing a routing switch platform on which the method and system in accordance with an embodiment of the invention may be practiced.

The description, which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following is an example of a network architecture in which a routing switch platform on which the method and system according to the present invention may operate.

Referring to FIG. 1, a communication network 100 is shown. Network 100 allows devices 102A, 102B, and 102C to communicate with devices 104A and 104B through network cloud 106. At the edge of network cloud 106, a routing switch 108 is the connection point for devices 102A, 102B and 102C to network cloud 106. In network cloud 106, a plurality of switches 110A, 110B and 110C are connected forming the communications backbone of network cloud 106. In turn, connections from network cloud 106 connect to devices 104A and 104B.

It will be appreciated that terms such as "routing switch", "routing switch platform", "communication switch", "communication device", "switch", "network element", and other terms known in the art may be used interchangeably to describe the routing switch 108.

Figure 2:
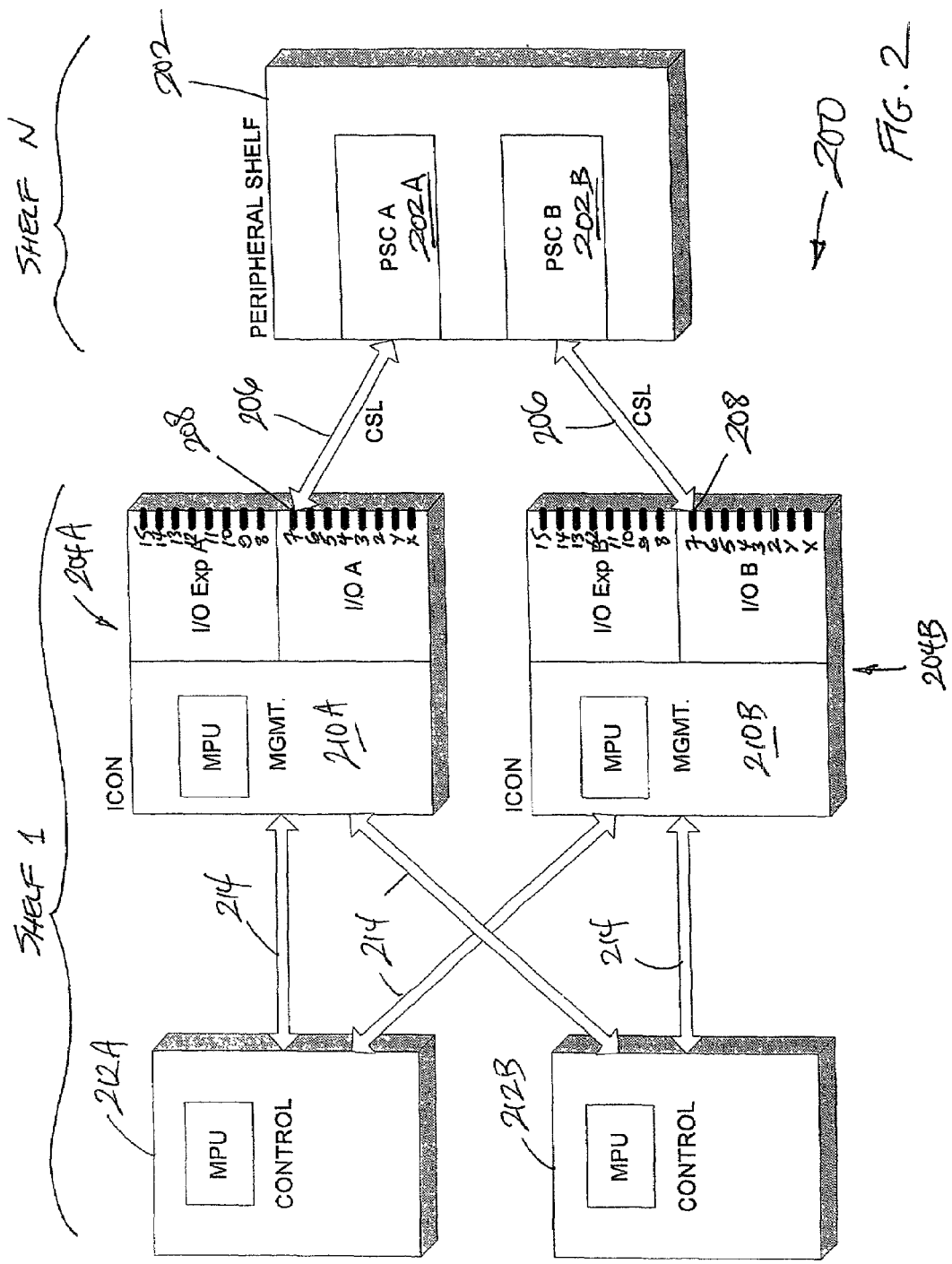
FIG. 2 is a block diagram of a control plane in the routing switch platform of FIG. 1.

In FIG. 2, shown and generally referred to by reference numeral 200 is a block diagram of a control plane within the routing switch 108. In this embodiment, shown by way of example, the control plane comprises a peripheral shelf (PS) 202 connected to a pair of inter-shelf connectors (ICONs) 204A, 204B by control service links (CSLs) 206. More specifically, first ends of the CSLs 206 are connected to a pair of peripheral shelf controllers (PSCs) 202A and 202B within the PS 202. Second ends of the CSLs 206 are connected to an I/O port on the ICONs 204A, 204B.

Still referring to FIG. 2, the ICONs 204A, 204B include a plurality of I/O ports identified, by way of example, as 'X', 'Y', and '2'through '15'. The CSLs 206 are shown connected to port '7' in each of the ICONs 204A, 204B. The I/O ports are managed by ICON management modules 210A, 210B. The ICON management modules 210A, 210B are connected to a pair of control complexes 212A, 212B by communication links 214. The communication links 214 may comprise, for example, an Ethernet connection.

The control complexes 212A, 212B comprise a central management point (CMP) for determining whether a cable is correctly connected. Also, each shelf controller 202A, 202B in the PS 202 comprises a shelf management point (SMP) which communicates with the CMP. As will be explained further below, the CMP and SMP co-operate to determine whether a shelf (e.g. shelf 202) is correctly connected and whether the shelf is given a shelf number and brought into service.

Figure 3:
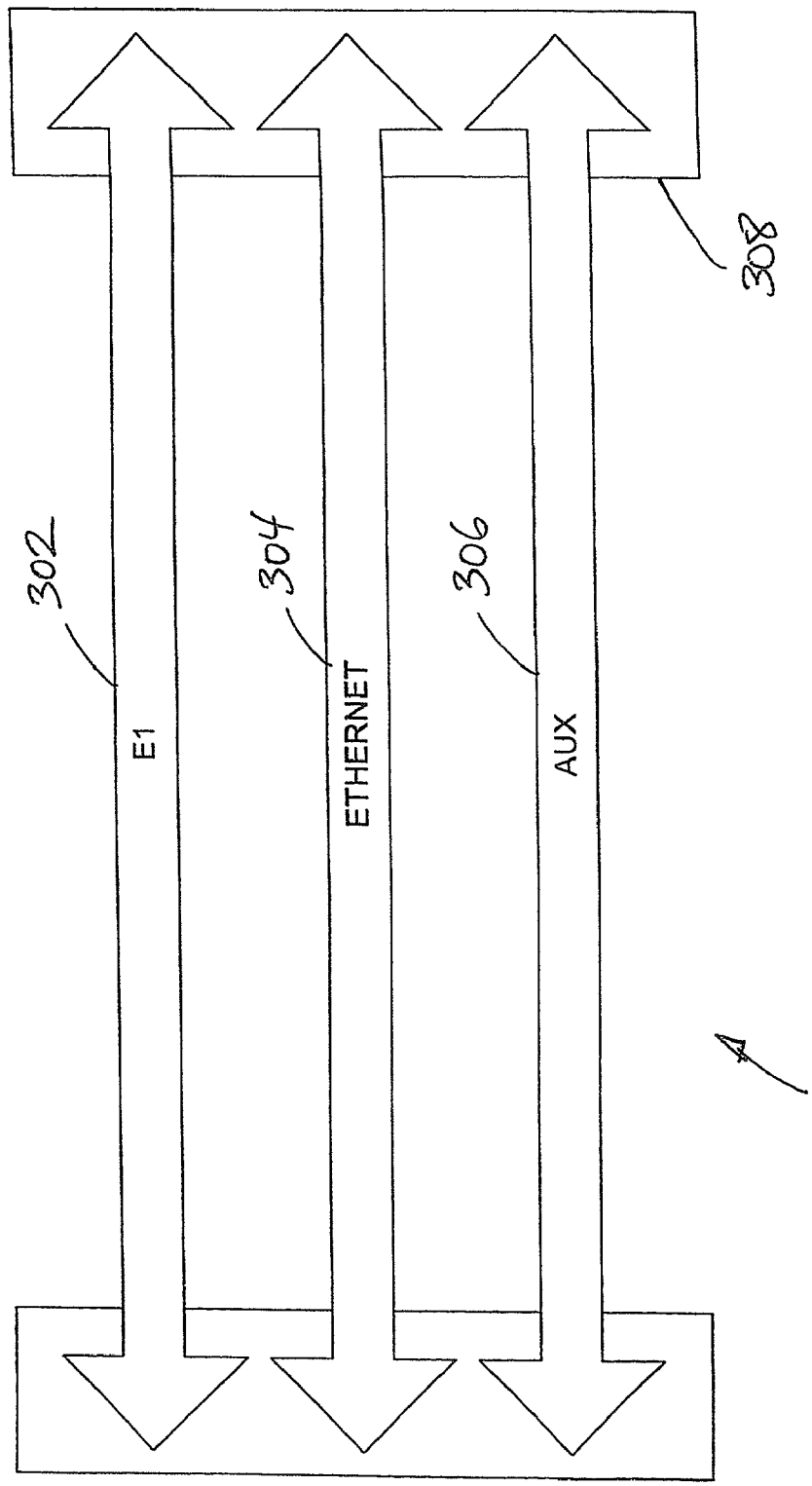
FIG. 3 is a schematic diagram of a control services link comprising a plurality of communications channels.

Now referring to FIG. 3, shown is a detailed view of a CSL 206 which may comprise a number of different types of communications channels. As an example, the CSL 206 may comprise an E1 channel 302, an Ethernet channel 304, and an optional auxiliary channel 306. The E1 channel 302 provides a dedicated point-to-point link for communicating information, such as cable identification, between the CMP and the SMP. The Ethernet channel 304 forms part of an inter-shelf communication channel shared with other components or modules in the routing switch 108. Finally, the optional auxiliary channel 306 may comprise, for example, an RTS channel (e.g. RS-485) which distributes system clock signals.

In an embodiment, all three communication channels 302, 305, 306 are bundled and run parallel through a single CSL 206. A connector 308 at each end of the CSL 206, bundles the communications channels and allows them to be connected together to a suitable connection point. To facilitate proper cabling, the connector 308 can be different on each end, and may be asymmetrically shaped to connect properly in only one possible orientation. The bundling allows only two possible conditions to occur: either all communications channels in the bundle are connected correctly, or they are not. This facilitates the system and method of automatically numbering shelves in accordance with the present embodiment, as will be explained in further detail, below.

Figure 4:
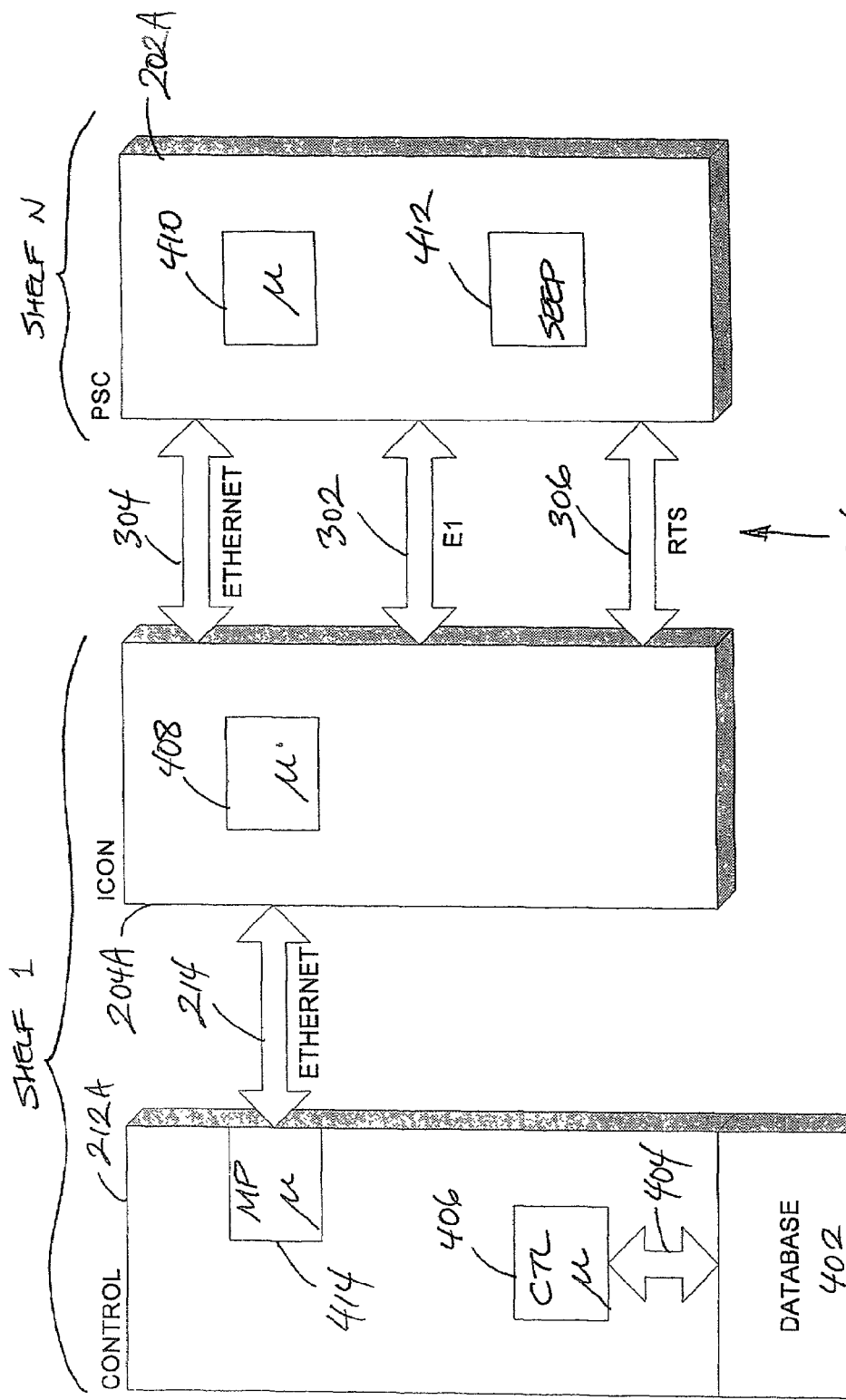
FIG. 4 is another block diagram showing certain dataflows between the elements of FIG. 4.

Now referring to FIG. 4, shown and generally referred to by reference numeral 400 is a block diagram representation of various data flows between the components of FIG. 2. For clarity, the redundancy in the control complex, the ICON, and the shelf controllers represented in FIG. 2 is not shown in FIG. 4. Rather, these components, including control complex 212A, ICON 204A and PSC 202A, are now represented by simple blocks. As shown, the control complex 212A is connected to the ICON 204A by an Ethernet connection 214. In turn, the ICON 204A is connected by a CSL 206 (comprising an E1 channel 302, an Ethernet channel 304, and an auxiliary RTS channel 306 as shown in FIG. 3). For the sake of clarity, only a single CSL 206 connection is shown. However, it will be understood that a plurality of CSLs 206 may connect the ICON 204A to a plurality of PSCs (as in FIG. 2).

The control complex 212A is also connected to a memory or database 402 by a link 404. It will be understood that the memory or database 402 may reside physically on the control complex 212A as an integrated circuit or be a physically separate unit. Each of the control complex 212A, the ICON 204A and the PSC 202A include a microprocessor 406, 408, 410, and 414 for processing communication signals. The CMP, mentioned earlier, may be embodied by the message processor (MP) microprocessor 414 in the control complex 212A, together with the control microprocessor 406 and database 402 containing configuration data. Note that microprocessors 406 and 414 need not be separate and the functionality of each may be combined into one processor.

Figure 5:
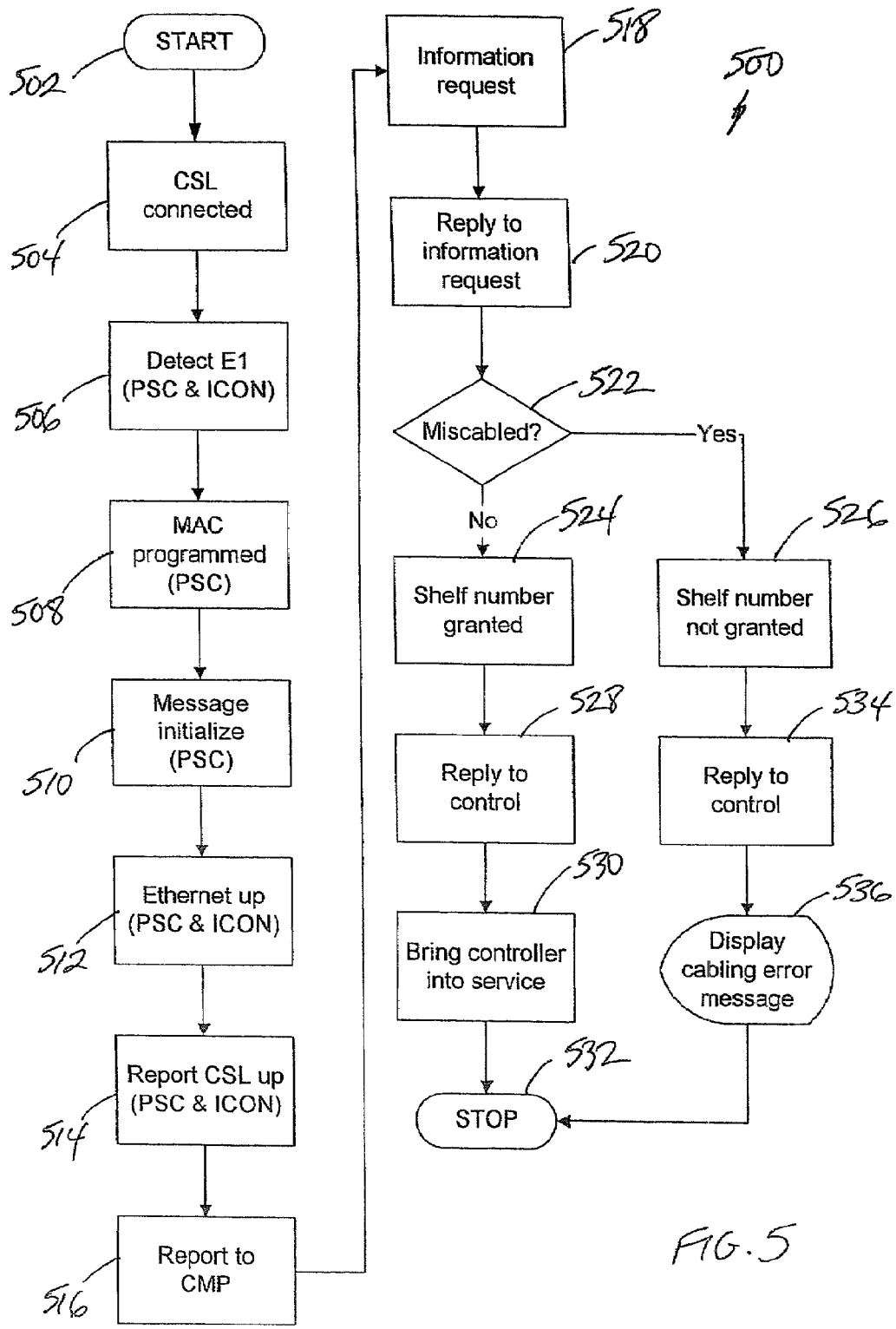
FIG. 5 is a flowchart of a process according to an embodiment showing a method of automatically numbering shelves between the elements shown in FIG. 5.

Now referring to FIG. 5, shown is a process 500 corresponding to an embodiment for automatically numbering shelves in accordance with the present invention. The process starts at block 502 and proceeds to block 504 which comprises physically connecting the CSL 206 between the ICON 204A and the PSC 202A (FIG. 4), or restarting the hardware. As noted, the CSL 206 may comprise an E1 channel 302, and Ethernet channel 304, and an auxiliary RTS channel 306.

The process 500 then proceeds to block 506 in which the microprocessor 410 in the PSC 202A detects connection of the CSL 206. More specifically, the microprocessor 410 first detects the E1 channel 302. Before the Ethernet channel 304 can be established, it is necessary to obtain the MAC address from the CSL 206. Unique addresses are driven by the ICON 204A on each CSL 206 to identify the cable number. The PSC 202A takes this cable number, looks up on a translation table which MAC address it should use, and sets the MAC address to this cable number. Once the MAC address is programmed at block 508, the Ethernet 304 is then enabled at block 510. Once the Ethernet 304 is enabled, the Ethernet channel can come up at block 512. In an embodiment, the MAC addresses are communicated directly over the point-to-point E1 channel and are used in place of IP addresses over the shared Ethernet. Thus, messages may be sent to specific MAC addresses which correspond to physical locations in the system.

The process 500 then proceeds to block 514 at which the ICON 204A reports to processor 406 in the control complex 212A that the CSL 206 is up. In the present example, it is assumed that the Ethernet link 214 between the control complex 212A and the ICON 204A is already established. Concurrently, at block 516, the microprocessor 406 in the control 2121A may report the connection of the CSL 206 to a second microprocessor 414 (i.e. the CMP).

The process then proceeds to block 518 at which the microprocessor 414 in the control complex 212A sends an information request to the PSC 202A. Ethernet message information that is requested by the control complex 212A from the PSC 202A include, but is not limited to, serial number, mate serial number (discussed below with reference to FIG. 6), card type, A/B slot indication, ICON and port number, whether the card is in "boot mode" and which of the A/B cards is active on the PSC 202A.

Whether or not the PSC 202A is boot mode, the PSC 202A replies to the information request at block 520. The reply from the PSC 202A again passes back to the control complex 212A. The process then proceeds to decision block 522.

At block 522, if the serial number information from the information received from the PSC 202A is in order (i.e. the PSC 202A is correctly cabled) the control complex 212A grants a shelf number by sending a grant message to the PSC 202A at block 524. The determination of whether the PSC 202A is correctly cabled is done according to certain operational principles, as outlined in Table A further below. This shelf number is based on which port of the ICON 204A the corresponding CSL 206 is connected to. In this example, if the PSC 202A is in good order, the control complex 212A will assign shelf no. '7' in ICON 204A (see FIG. 2 ). Once the grant message is sent at block 524, the PSC 202A is notified. At block 528, the PSC 202A receives the grant message and replies to the control complex 212A that everything Is in order. At block 530, the control complex 212A then brings PSC 202A into service. The process 500 then concludes.

If, at decision block 522, the PSC 202A is in boot mode, this indicates an error condition, and the PSC 202A is given a temporary shelf number by the control complex 212A. The temporary shelf number allows diagnostic software to be downloaded to the PSC 202A in order to ascertain the problem. Once the temporary shelf number is granted, the PSC 202A replies to the control complex 212A and the user or installer attempts to identify and correct the error condition. The temporary shelf number is removed once the PSC 202A resets. In order to provide the temporary shelf number, the PSC 202A must still undergo steps at block 524 and 528, as described above.

If, at decision block 522, the information received from the PSC 202A is not in order (i.e. a cable has been connected incorrectly), process 500 proceeds to block 526 and a "shelf number not granted" message is sent by the control complex 212A to the PSC 202A. The PSC 202A receives the "shelf number not granted" message and replies to the control complex 212A at block 534. To indicate that a shelf number was not granted, an error message is displayed at display block 536. The process then proceeds to block 532 and concludes.

The process in which shelf numbers are assigned by process 500 may be guided by certain operational principles. Generally speaking, the shelf number is defined by which ICON CSL port(s) the shelf is connected to. The active control complex 212A assigns shelf numbers to shelves and prevents a shelf number from being assigned to two separate shelves. The control complex 212A also detects when CSLs 206 are incorrectly cabled.

As noted, shelf numbers may be assigned by the control complex 212A based on certain operating principles, as outlined in Table A. Note that a principle can only be applied if it does not violate a lower number principle. For example, principle 4 is only applied if acting on principle 4 does not violate principles 1, 2 and 3.

TABLE A

Principle 1  A shelf controller that is running from the boot application is always given a shelf number so that the shelf controller can have its application downloaded.
A shelf controller running from the boot application does not provide services to the shelf (i.e. no shelf controller functionality is provided by the shelf controller).
Principle 2  A shelf can only be assigned one shelf number at a time.
Principle 3  No two shelves in the system can be simultaneously assigned the same shelf number.
This principle does not apply if one of the shelf controllers is in boot.
Principle 4  Switching shelves are only allowed in CSL ports X and Y, I/O shelves are only allowed in CSL ports 2 to 15.

TABLE A-continued

Principle 5  A shelf controller can only be assigned a shelf number if it is cabled to the proper ICON. Shelf controller A must be connected to ICON A, and shelf controller B must be connected to ICON B.
Principle 6  To change a shelf number of a shelf once a shelf number has been assigned, both CSLs to the shelf must be cabled to the same CSL port number and the CSLs must come up.
Principle 7  A shelf can be assigned a shelf number with only one shelf controller provided that the shelf controller was not part of the system in the previous configuration, as stored in memory.
Principle 8  If a shelf controller was part of the system before, and the configuration is still stored is memory, then the only shelf number allowed for the shelf is the one that the shelf last had.

Referring to Table A, above, principle 1 is that a shelf controller that is running from the boot application is always given a shelf number. As explained earlier, this is so that the shelf controller can have software downloaded to it. While a shelf number is assigned by the control, the shelf controller is not otherwise enabled and does not provide any services to the shelf.

Principle 2 as outlined in Table A provides that a shelf can be assigned only one shelf number at a time. By way of example, referring back to FIG. 2 and FIG. 4, if PSC 202A is being assigned for the first time, then control complex 212A will assign the port number '7' on the ICON 204A. If, for example, PSC B 202B (FIG. 2) was connected to port '5' on ICON 204B, then there would be a mismatch and PSC B 202B would not get a shelf number. This may occur, for example, when the routing switch 108 is undergoing maintenance and the CSLs 206 are being disconnected and reconnected. Advantageously, there is no need to attempt to detect duplicate shelf numbers in the system, because this cannot occur. Therefore, the system remains entirely deterministic.

Principle 3 provides that no two shelves in the system can be simultaneously assigned the same shelf number (unless one of the shelves is in "boot mode"). This follows from the fact that shelf numbers are associated with the CSL port to which the shelf is physically connected, and it is not possible for more than one card to be connected to a particular port on ICON 204A.

Principle 4 is implementation specific and provides that switching shelves are only allowed in CSL ports X and Y. Also, I/O shelves are only allowed in CSL ports 2 to 15. Ports X and Y are associated with switching fabrics X and Y in a corresponding data plane of routing switch 108 (not shown). Switching fabrics X and Y provided redundant datapaths in the data plane through which data may be transmitted. I/O shelves connectable to ports 2 to 15 allow other network elements to connect to the routing switch 108. It will be appreciated that other configurations are possible.

Principle 5 provides that a shelf controller can only be assigned a shelf number if it is cabled to the proper ICON. For example, in FIG. 2, PSC A 202A must be connected to ICON 202A in order to be assigned a number and PSC B 202B must be connected to ICON 202B in order to be assigned a number. This ensures that connections made through each of ICON 204A and ICON 204B have the appropriate A/B designation, making it possible for any line cards connected to the peripheral shelf 202 to communicate properly through both A and B channels.

Principle 6 provides that, in order to change a shelf number of a shelf once a shelf number has been assigned, both CSLs to the shelf must be cabled to the same CSL port number (in the respective ICONs) and the CSLs must come up. This insures that incorrect cabling during a maintenance operation, for example, does not affect operation of the system. However, if both CSLs are moved at the same time to another port number in the respective ICONs, then this can be viewed as an indication that the user wants to change the shelf number.

Principle 7 provides that a shelf can be assigned a shelf number with only one shelf controller provided that the shelf controller was not part of the system in the previous configuration, as stored in memory. This principle allows a shelf to run with only one of its shelf controllers, for example, when the shelf is first being commissioned and it is discovered that one of the shelf controllers is not operational.

Finally, principle 8 provides that, if a shelf controller was part of the system before, and the configuration is still stored is memory, then the only shelf number allowed for the shelf is the one that the shelf last had. This principle enables the previous cabling configuration to be restored, for example, after a maintenance procedure in which the CSLs 206 are disconnected and reconnected.

In an embodiment, shelf numbers are assigned to a shelf regardless of whether that shelf is configured in the system. For example, when a user expands the number of shelves on a system, the control complex 212A detects the presence of the additional shelf via the CSLs and assigns the new shelf a shelf number, in accordance with process 500 and the principles outlined above. This helps a user to configure a new system since it is possible to confirm the shelf numbers assigned to shelves before the shelves are configured in the system (for example, the shelf numbers may go in order based on the physical location of the shelves in the central office.)

Advantageously, no hardware configuration is required at the shelf level, and no software configuration is required at any intermediate level, such as at the ICON 204A. Rather, the CMP residing on the control complex 212A remains in complete control of the system, facilitating the connection of numerous shelves by communicating in a point-to-point fashion with SMPs on each of the connecting shelves. Thus, new shelves may be added, or faulty shelves may be replaced, quickly and accurately without affecting any currently operating shelves.

Figure 6:
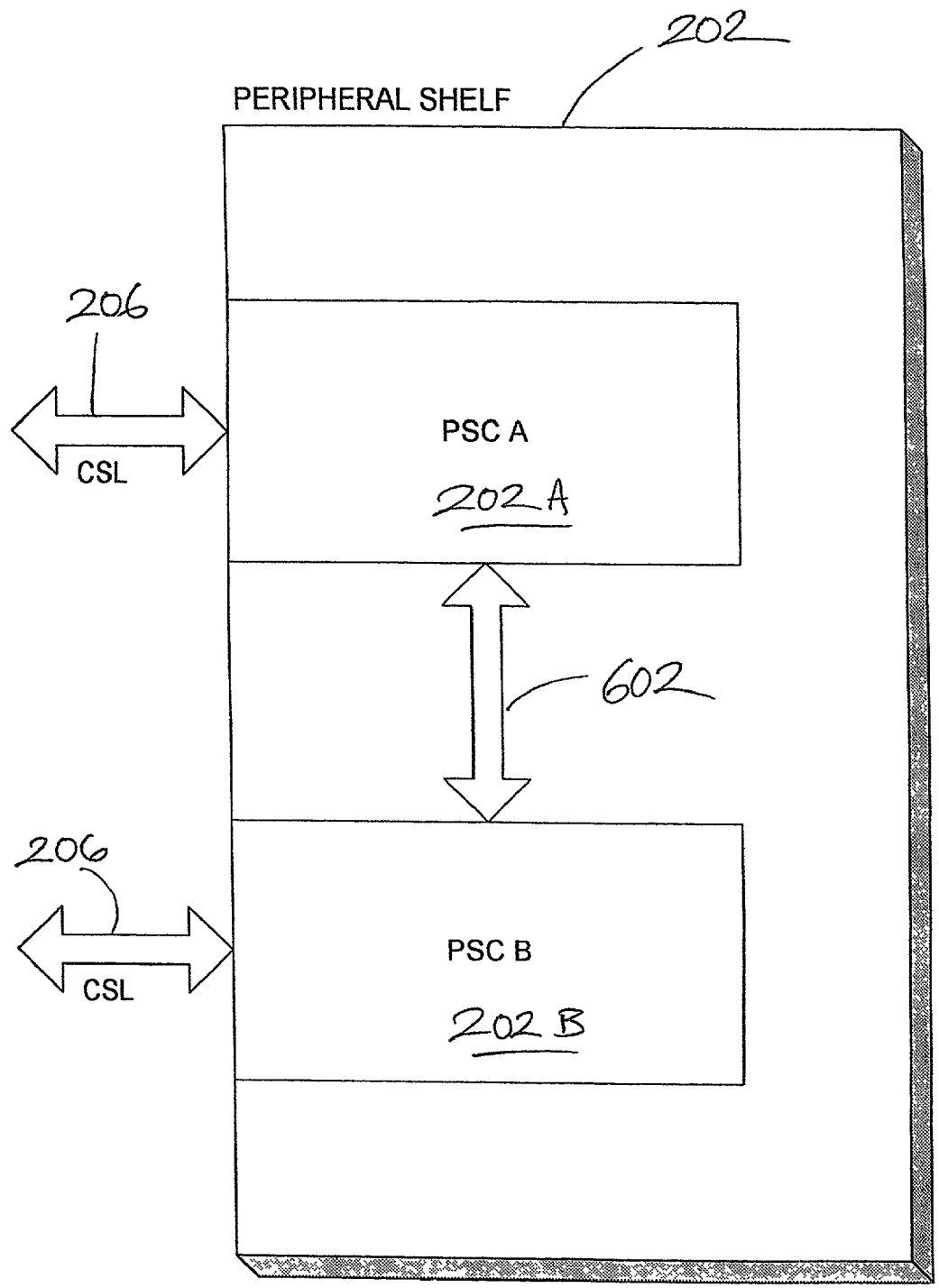
FIG. 6 is a block diagram showing an active/inactive pair of shelf controllers.

Now referring to FIG. 6, the relationship between an active shelf controller and an inactive shelf controller is shown by way of example. On peripheral shelf 202, each of PSC A 202A and PSC B 202B must go through the process 500 (FIG. 5) for automatically numbering shelves in order to receive a shelf number. In an embodiment, the relationship between PSC A 202A and PSC B 202B is established by the serial numbers received from the shelf controllers 202A, 202B during the process 500 (requested at step 518, FIG. 5). Generally speaking, one of the shelf controllers, say PSC A 202A, is designated as the active shelf and it is brought into service first through process 500. The other shelf controller, PSC B 202B is then designated as the corresponding inactive shelf controller and is brought into service after PSC A 202A. The shelf controllers 202A, 202B form an active/inactive pair on a single, physical shelf 202 (FIG. 2).

To facilitate the formation of an active/inactive pair, the shelf controllers 202A, 202B are connected by a physical mate link 602 which allows exchange of information between the controllers 202A, 202B. In an embodiment, the controllers 202A, 202B exchange serial numbers so that each controller pair 202A, 202B is recognized as such by the control complex 212A. Note that, if one of the controllers is in "boot mode", the controllers 202A, 202B do not perform this exchange, and the controller in "boot mode" never becomes an active card.

In operation, the active controller 202A may be brought into operation first using the process 500 described above. In order for the inactive controller 202B to be configured, the controller 202B must communicate with the active controller 202A through the mate link 602 to exchange information. Only once this exchange has occurred can the inactive controller 202A detect and bring up its CSL link to ICON 204B. In bringing up the inactive controller 202A, process 500 can be followed, and it can be determined at decision block 522 whether each of the controllers 202A and 202B have been properly cabled.

Assuming that the controllers 202A, 202B have been properly cabled and the CSLs 206 are up, the inactive controller 202B is brought into standby mode, ready to take over should the active controller 202A experience errors or faults.

Still referring to FIG. 6, in the event that both controllers 202A and 202B become disabled, and both CSL links go down, the controllers 202A, 202B may be reset and process 500 repeated to bring both controllers 202A, 202B into service. Alternatively, both controllers 202A, 202B may be faulty and may need to be replaced by a new pair of active/inactive controllers. In such an event, the principles outlined above in Table A can be followed to reassign or change the shelf numbers for the new pair of controllers as desired.

It is noted that those skilled in the art will appreciate that various modifications of detail may be made to the present embodiment, all of which would come within the scope of the invention. For example, while an embodiment of the method according to the present invention has been described with reference to a process comprising a sequence of steps, it will be understood that the number of steps and the sequence of steps is not limiting. Rather, modifications may be made to the number and sequence of steps which does not affect the nature or outcome.

I claim:

1. A method of assigning a shelf identifier to a shelf in a network element having a plurality of shelves, the method comprising the steps of:
   a) physically connecting a shelf link cable between a controller shelf and the shelf in the network element, said shelf link cable carrying a dedicated point-to-point channel and a shared communications channel bundled together in said shelf link cable;
   b) the controller shelf assigning a connection identifier to the shelf link cable, the connection identifier corresponding to an identifier of a port associated with the controller shelf to which the shelf link cable is connected;
   c) the controller shelf communicating the connection identifier assigned to the shelf link cable over the point-to-point channel;
   d) the shelf in the network element determining a communications address for use on said shared communications channel from the connection identifier communicated over said point-to-point channel;
   e) the controller shelf requesting, via the shared communications channel and using said communications address, information about the shelf in the network element;
   f) the controller shelf using the requested information received from the shelf in the network element to determine whether the shelf in the network element is connected to the controller shelf in accordance with predetermined system configuration rules;
   g) the controller shelf assigning the shelf identifier to the shelf in the network element by sending a grant message to the shelf in the network element in response to the controller shelf determining that the shelf in the network element is connected in accordance with the system configuration rules, wherein the shelf identifier uniquely identifies said shelf in the network element to said network element; and
   (i) the controller shelf bringing the shelf in the network element into service in response to a favorable reply to said grant message from the shelf in the network element.

2. The method according to claim 1, wherein for step g), said shelf has only one shelf identifier at any one time.

3. The method according to claim 2, further comprising retrieving from a configuration database previously stored configuration information for said shelf and a particular shelf identifier that was previously assigned to said shelf, and in step g) assigning said particular assigned shelf identifier as the shelf identifier.

4. A method according to claim 3, further comprising:
   j) identifying a pair of shelf management points (SMPs) of said shelf as an active/inactive pair by said controller shelf by:
   assigning said particular shelf identifier to said pair of SMPs, said SMPs exchanging information between them; and
   associating one of said SMPs with the connection between the shelf and the controller shelf, and associating the other of said SMPs with another connection between the shelf and the controller.

5. The method according to claim 4, further comprising allowing the assigned shelf identifier to be changed only when said identifier of said port matches another port identifier associated with another port of said controller shelf connected to said another connection.

6. The method of claim 1, wherein said shared communications channel is an Ethernet channel and said communications address is a MAC address.

7. The method of claim 6, wherein said point-to-point channel is a time division multiplexed channel.

8. The method of claim 6, wherein the shelf in the network element determines the MAC address by looking up the connection identifier in a translation table.

9. The method of claim 1, wherein said predetermined system configuration rules include the following:
   a) a shelf controller that is running from a boot application is always given a shelf number so that the shelf controller can have its application downloaded;
   b) a shelf can only be assigned one shelf number at a time;
   c) no two shelves in the system can be simultaneously assigned the same shelf number unless one of the corresponding shelf controllers is in boot;
   d) switching shelves are only allowed in predetermined ports, and input/output shelves are only allowed in different predetermined ports; and
   e) a shelf controller can only be assigned a shelf number if it is cabled to the correct controller shelf.

10. A network comprising:
   a controller shelf;
   a shelf in a network element having a plurality of shelves; and
   a shelf link cable physically connected between the controller shelf and the shelf in the network element, the shelf link cable carrying a dedicated point-to-point channel and a shared communications channel bundled together in said shelf link cable;

and wherein the controller shelf is configured, upon physical connection of said shelf link cable, to:

a) assign a connection identifier to the shelf link cable, the connection identifier corresponding to an identifier of a port associated with the controller shelf to which the shelf link cable is connected;

b) communicate the connection identifier assigned to the common links over the point-to-point channel;

c) request information about the shelf in the network element via the shared communications channel and using a communications address determined by the shelf in the network element from the connection identifier communicated over the point-to-point channel;

d) use the requested information received from the shelf in the network element to determine whether the shelf in the network element is connected to the controller shelf in accordance with predetermined system configuration rules;

e) assign the shelf identifier to the shelf in the network element by sending a grant message to the shelf in the network element in response to the controller shelf determining that the shelf in the network element is connected in accordance with the system configuration rules, wherein the shelf identifier uniquely identifies said shelf in the network element to said network element; and (f) bring the shelf in the network element into service in response to a favorable reply to said grant message from the shelf in the network element.

11. The network of claim 10, wherein in the case of a shelf that has been physically disconnected from, and reconnected to, the shelf controller, the shelf controller is configured to assign the same shelf identifier the shelf in the network that said shelf in the network was assigned when it was previously connected to the controller shelf.

12. The network of claim 10, wherein the shared communications channel is an Ethernet channel and the point-to-point channel is a time division multiplexed channel.

* * * * *